United States Patent

[11] 3,624,053

[72] Inventors Hugh Harper Gibbs
Wilmington, Del.;
Richard Normal Griffin, Wayne, Pa.
[21] Appl. No. 290,184
[22] Filed June 24, 1963
[45] Patented Nov. 30, 1971
[73] Assignee E. I. du Pont de Nemours and Company
Wilmington, Del.
The portion of the term of the patent subsequent to June 26, 1979, has been disclaimed.

[54] TRIFLUOROVINYL SULFONIC ACID POLYMERS
3 Claims, No Drawings
[52] U.S. Cl..................................................... 260/79.3 R,
260/2.2 R, 260/79.3 M, 260/543 F
[51] Int. Cl..................................................... C08f 13/00
[50] Field of Search........................................ 260/79.3 M

[56] References Cited
UNITED STATES PATENTS
3,014,317 6/1962 Gibbs.......................... 260/2.2
3,128,298 4/1964 Lefevre........................ 260/79.3

*Primary Examiner*—Joseph L. Schofer
*Assistant Examiner*—C. A. Henderson, Jr.
*Attorney*—Herbert W. Larson CLAIM: 1. A normally solid ion exchange resin polymer of trifluorovinyl sulfonic acid containing units of the structure

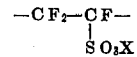

where X is a member of the class consisting of hydrogen, alkali metals, ammonium ions and amine ions.

TRIFLUOROVINYL SULFONIC ACID POLYMERS

The present invention relates to novel polyacids, and, more particularly, to polymers of trifluorovinyl sulfonic acid.

The polyacids of the present invention are prepared by the hydrolysis of polymers of trifluorovinyl sulfonyl fluoride. The Polymerization of trifluorovinyl sulfonyl fluoride is disclosed in our U.S. Pat. No. 3,041,317, issued June 26, 1962. The preferred polyacids of the present invention are copolymers of trifluorovinyl sulfonic acid and fluoroethylenes, such as vinyl fluoride, vinylidene fluoride, trifluoroethylene, chlorotrifluoroethylene and tetrafluoroethylene. Particularly preferred copolymers are those of trifluorovinyl sulfonic acid and tetrafluoroethylene.

The polytrifluorovinyl sulfonic acids are of particular utility as ion exchange resins and as acid catalysts. Although theoretically the homopolymers of trifluorovinyl sulfonic acid are the most useful in these applications because of their highest concentration of acid groups, the polyacids generally employed are copolymers of trifluorovinyl sulfonic acids with fluorinated ethylenes, and, particularly, tetrafluoroethylene, which contain from 0.5 to 50 mole percent of the trifluorovinyl sulfonic acid, since such copolymers are more readily and less expensively obtained from the polymerization of trifluorovinyl sulfonyl fluoride.

The hydrolysis of the trifluorovinyl sulfonyl fluoride polymer to the acid is generally obtained by reacting the starting material in the presence of water with a strong base, such as an alkali metal hydroxide or an organic amine, and thereafter exchanging the resulting salt radical with a strong inorganic acid, such as hydrochloric, nitric or sulfuric acid.

In addition to their utility as ion exchange resins and acid catalysts, the trifluorovinyl sulfonic acid resins of the present invention also have utility as thermally stable plastics.

The surprising feature of the polyacids of the present invention, however, is their utility as acid catalysts. Thus, it was found that the polymeric trifluorovinyl sulfonic acids catalyze reactions normally catalyzed by sulfuric acid, such as the hydrolysis of esters, or correspondingly the manufacture of esters from alcohols and acids. since the reaction is an equilibrium reaction, the formation of acetals by the reaction of aldehydes with alcohols, and the hydrolysis of organic nitriles to carboxylic acids. The advantages resulting from the use of polymeric trifluorovinyl sulfonic acid as an acid catalyst are substantial. Aside from the sulfonic acid group, the polymeric trifluorovinyl sulfonic acids of the present invention are extremely temperature stable and chemically inert and, thus, do not interfere in the reaction catalyzed. They permit the use of highly corrosive or reactive reagents and, furthermore, permit the operation of the acid catalyzed reaction at extremely high temperatures. The great advantage of the trifluorovinyl sulfonic acid resin over sulfuric acid is the ready separation of the reaction products from the catalyst, the ability to regenerate the catalyst, the absence of sulfuric acid waste, and the noncorrosiveness of the catalyst.

The invention is further illustrated by the following example.

EXAMPLE

Into a stainless steel shaker tube was charged 13 g. of trifluorovinyl sulfonyl fluoride, 30 ml. of perfluorodimethylcyclobutane, and 10 g. of gaseous tetrafluoroethylene. A separate vessel of 60 ml. volume was filled with a gaseous mixture of 2.2 percent by weight of $N_2F_2$ in nitrogen to a pressure of 630 mm.Hg absolute. This mixture was then pushed into the reaction vessel by a stream of nitrogen gas. The reaction mixture was heated to 75° C. giving a total pressure of 900 p.s.i.g. After 1.66 hours of agitation at this temperature, the pressure had dropped to 850 p.s.i.g., and there was no further change in pressure during an additional 1.20 hours of heating.

The reaction mixture was cooled and transferred to a round bottom flask. Volatile components of the mixture were removed under vacuum while heating the flask with an infrared lamp. The residue of 13.5 g. of copolymer remained in the flask. The product was combined with 250 ml. of water and cut in a high-speed blender. It was isolated by filtration, air dried, and passed through a 20 mesh screen. A 0.3 g. portion of the product was pressed at 275° C. to give a coherent film. The film showed a strong absorbance band at 6.85 microns in the infrared spectrum, which is evidence of incorporation of the comonomer containing $—SO_2—$ groups.

In order to hydrolyze pendent $—SO_3F$ groups in the copolymer to $—SO_3Na$ groups, an 8.6 g. portion of the copolymer was heated for 5 hours at 150° C. in the presence of a liquid medium consisting of 4 ml. of 50 percent by weight aqueous sodium hydroxide solution, 80 ml. of methanol and 10 ml. of triethylamine. The hydrolyzed copolymer was recovered by filtration, washed with methanol and air dried.

The $—SO_3Na$ groups in the hydrolyzed product were converted to $—SO_3H$ groups by an ion exchange reaction carried out as follows: The hydrolyzed copolymer was stirred in 150 ml. of a 1:1 volumetric mixture of methanol and concentrated hydrochloric acid and heated under reflux for a period of 16 hours. The product was removed by filtration and washed with a 1:1 volumetric mixture of methanol and water. After vacuum drying at 85° C. 7.6 g. of copolymer containing $—SO_3H$ groups was recovered.

The presence of $—SO_3H$ groups was verified by titration as follows: A 0.9146 g. sample of the acid resin copolymer was combined with 1 g. of sodium chloride and about 20 ml. of a 1:1 volumetric mixture of methanol and water. The mixture was sparged with nitrogen, and 3 ml. of standard 0.1 N sodium hydroxide was added. The mixture was stirred for several hours, and excess sodium hydroxide was determined by back titration with standard 0.1 N hydrochloric acid to the methyl red endpoint. The sample was found to contain 0.065 milliequivalents of $—SO_3H$ groups, showing it to be an ion exchange resin having an equivalent weight of approximately 14,000.

Employing the foregoing procedure, it is possible to prepare trifluorovinyl sulfonic acid resins containing higher concentrations of polymerized trifluorovinyl sulfonic acid by employing higher concentrations of trifluorovinyl sulfonyl fluoride in the polymerization, including homopolymers. Vinyl fluoride, vinylidene fluoride, trifluoroethylene or chlorotrifluoroethylene can be substituted for the tetrafluoroethylene to give rise to the corresponding copolymers.

In their capacity as ion exchange resins, the trifluorovinyl sulfonic acid copolymers of the present invention can be readily converted to other monovalent metal salts or salts of other monovalent anions such as the ammonium ion or amine ions.

We claim:

1. A normally solid ion exchange resin polymer of trifluorovinyl sulfonic acid containing units of the structure

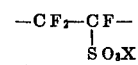

where X is a member of the class consisting of hydrogen, alkali metals, ammonium ions and amine ions.

2. A normally solid ion exchange resin copolymer of a fluoroethylene and trifluorovinyl sulfonic acid containing units of the structure

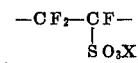

where X is a member of the class consisting of hydrogen, alkali metals and ammonium ions and amine ions.

3. The copolymer of claim 2 wherein the fluoroethylene is tetrafluoroethylene.

* * * * *